Patented Feb. 7, 1933

1,896,312

UNITED STATES PATENT OFFICE

WILLIAM C. HOOEY, OF PALMERTON, PENNSYLVANIA, ASSIGNOR TO THE NEW JERSEY ZINC COMPANY, OF NEW YORK, N. Y., A CORPORATION OF NEW JERSEY

MANUFACTURE OF PIGMENTS BY WET-PRECIPITATION

No Drawing. Application filed January 21, 1929. Serial No. 334,120.

This invention relates to the manufacture of pigments by wet-precipitation and has for its object the provision of improvements in the manufacture of pigments by wet-precipitation. The invention relates more particularly to the manufacture of such pigments as lithopone, zinc sulfide and the like.

Lithopone is manufactured by bringing together aqueous solutions of zinc sulfate ($ZnSO_4$) and barium sulfide (BaS), usually in about molecular proportions. The mixture of liquors is suitably mixed and a flocculent white precipitate consisting for the most part of zinc sulfide (ZnS) and barium sulfate ($BaSO_4$) is formed:

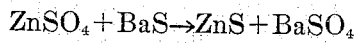
$$ZnSO_4 + BaS \rightarrow ZnS + BaSO_4$$

The coprecipitate is washed, filter-pressed and dried to form what is generally called "crude lithopone". When this crude lithopone is appropriately calcined and suddenly quenched in water, its characteristics are so modified as to fit it for paint purposes. The hiding power of lithopone as a pigment for paints is for the most part dependent upon its zinc sulfide content, while the barium sulfate functions as a white, inert, filler.

In my co-pending applications, Serial Nos. 75,621 and 75,622, filed December 15, 1925, of which the present application is a continuation in part, I have described methods of control in the manufacture of lithopone whereby a product of uniform quality or of regulated physical properties may be obtained. According to the inventions therein disclosed, predetermined excesses and ratios of hydrate to sulfhydrate radicals are established in the crude pulp at the end point of the precipitating step. It is therein pointed out that recognition should be made in the manufacture of lithopone of the fact that the so-called "barium sulfide" liquor hydrolyzes in the presence of water to form barium hydrate, $Ba(OH)_2$, and barium sulfhydrate $Ba(SH)_2$. Instead of merely employing an excess of barium sulfide liquor, whatever its hydrate and/or sulfhydrate content may happen to be, in the main precipitation step, as has been the customary procedure, the excess and ratio of hydrate to sulfhydrate in the crude pulp at the end point of the precipitating step should be predetermined and maintained for the production of a final pigment of regulated and uniform physical properties.

Such physical properties as hiding power, oil absorption, color, light resistance, etc., may be appropriately influenced and to a desirable extent regulated by suitable control of the hydrate and sulfhydrate content of the crude pulp at the end point of the precipitating step. As pointed out in the above mentioned copending applications, it is often desirable to add barium hydrate to the "barium sulfide" liquor or to the crude pulp at the end point of the precipitating step in order to establish the desired excess and ratio of hydrate to sulfhydrate. This is particularly true when the "barium sulfide" liquor is relatively low in hydrate and high in sulfhydrate radicals, as when the materials, such as barytes, going into the manufacture of the barium sulfide yield a barium sulfide liquor that is deficient in barium hydrate content.

A proper balance of hydrate to sulfhydrate radicals in the crude pulp at the end point of the precipitating step can sometimes be obtained, for example, by using a barium sulfide liquor in which those radicals are present in appropriate ratios. Such "barium sulfide" liquor may occasionally be obtained by suitably blending high iron barytes (which give high yields of barium hydrate) with low iron barytes (which give low yields of barium hydrate) in order to obtain a barium sulfide product that on hydrolysis with water yields substantially the ratio of hydrate to sulfhydrate desired. This procedure is, however, frequently not practicable because of the unavailability of such ores for blending purposes. And, even though such ores are available, it is difficult to blend them in the proper proportions. In order to practice the inventions above referred to, it then generally becomes necessary to add barium hydrate as such to the lithopone making process.

In the practice of the present invention barium hydrate may be made and added as a step in the regular lithopone making process. Moreover, the lithopone may be suitably enriched by the addition thereto of zinc sulfide formed as a reaction product in the making of the barium hydrate.

The present invention contemplates the method of manufacturing pigments by wet-precipitation by which a metallic oxide in a finely dispersed state is subjected to the action of an aqueous solution of a metallic sulfide.

In the case of manufacturing lithopone, the present invention involves the side-step of producing barium hydrate in solution and a precipitate of zinc sulfide. Some of the "barium sulfide" liquor employed in the main lithopone precipitating step is made to react with zinc oxide:

$$BaS + H_2O + ZnO \rightarrow ZnS + Ba(OH)_2$$
$$Ba(SH)_2 + 2ZnO \rightarrow 2ZnS + Ba(OH)_2$$

The entire reaction mixture or slurry may be added to the lithopone making process, preferably in the crude pulp during the main precipitating step; although the mixture may advantageously be added to the barium sulfide liquor before its introduction into the precipitating step. Such an addition enriches the lithopone in both zinc sulfide and barium hydrate.

My investigations have shown that unless the zinc oxide pigment employed has a very minute particle size, the reaction with aqueous barium sulfide will not take place to a sufficient extent. In other words, the total surface area of the zinc oxide particles exposed to the aqueous barium sulfide should approach a maximum as far as possible. I have found that a particle size not greater than about 0.15 microns is particularly suitable in the practice of the invention. By a zinc oxide pigment of very minute particle size, and of the order not larger than about 0.15 microns, I mean a zinc oxide pigment in accordance with United States Patents Nos. 1,522,096, 1,522,097 and 1,522,098. The more finely divided the zinc oxide pigment is, the greater will be the total surface area of the pigment offered to the aqueous barium sulfide. A substantially complete conversion of the available zinc to zinc sulfide may then be effected, particularly when the reaction is conducted at an elevated temperature and the slurry is suitably agitated.

If the particle size of the zinc oxide pigment employed is so large that the reaction does not go to substantial completion, the resulting zinc sulfide precipitated will intermix with the unconverted zinc oxide. This is the usual case when ordinary commercial grades of zinc oxide are employed. Since zinc oxide is well known as an objectionable impurity in lithopone, the barium hydrate must then be separated from the solids. The barium hydrate may be employed as an addition in the lithopone making process, but the solids must be discarded.

In the present practice of the invention, a small tub about 3 feet in diameter and 3 feet high is placed above a lithopone precipitating tank. A coil of iron pipe containing a plurality of small holes is placed on the bottom of the tub, so that when steam is passed through the pipe it will escape through the small holes and percolate throughout the contents of the tub. The tub is provided at its top with an inlet from a barium sulfide liquor line, and at its bottom with a slurry outlet to the precipitating tank.

When it is desired to add barium hydrate to the lithopone making process, the tub is filled about three quarters full of "barium sulfide" liquor. A sample of this liquor is then analyzed for its sulfhydrate content. The steam valve is opened, and a fine particle size zinc oxide is added to the liquor in the tub to convert the barium sulfide into barium hydrate.

In analyzing or testing the barium sulfide liquor for its sulfhydrate content, the following procedure has been found convenient in actual practice:

A ten cubic centimeter (cc.) sample of the "barium sulfide" liquor is put into a beaker containing 250 cc. of water. Three drops of phenolphthalein indicator are added to the mixture, and the solution is titrated to a colorless end point with 0.35 N hydrochloric acid (HCl). To this same sample three drops of methyl orange indicator are then added, and the mixture is titrated with 0.35 N hydrochloric acid to a slight pink end point. The first part of the analysis with the phenolphthalein indicator determines the strong basic radical (OH), while the second part of the analysis with the methyl orange indicator determines the weak basic radical (SH). If $a$ and $b$ represent the number of cubic centimeters of hydrochloric acid used in the first and second parts, respectively, of the analysis, then the percentage of hydrate and sulfhydrate radicals in the "barium sulfide" liquor are calculated as follows:

$$\text{Per cent hydrate } OH = \frac{a}{a+b} \times 100$$

$$\text{Per cent sulfhydrate } SH = \frac{b}{a+b} \times 100$$

In practice the reacting ingredients are advantageously brought together in substantially correct proportions to effect the desired conversion. Thus, the proper amounts of zinc oxide additions may be determined by calculation from the quantity and analysis of the barium sulfide liquor employed.

The live steam rising through the slurry within the tub acts to both agitate and heat it. The reaction proceeds with more rapidity and completeness at an elevated temperature.

When the slurry reaches the boiling point, the steam is turned off and a sample of the slurry is filtered and analyzed for its sulfhydrate content according to the method outlined above.

If this titration shows that the sulfhydrate content has been all, or substantially all, removed from the solution; or, expressing it differently, that the barium sulfhydrate present in the "barium sulfide" liquor has been substantially converted to barium hydrate, the outlet valve at the bottom of the tub is opened, and the slurry containing both the barium hydrate solution and the zinc sulfide precipitate is allowed to run into the crude pulp of the lithopone making process. If, on the other hand, the titration shows that a substantially complete conversion of the barium sulfhydrate to barium hydrate has not yet been effected, the steam valve is opened once more for another short period, and then turned off and another sample of the slurry is tested. This procedure is repeated until substantially complete conversion from barium sulfhydrate to barium hydrate has been accomplished. Then the slurry is drawn into the lithopone precipitating tank in such quantities as are needed. A substantially complete conversion of barium sulfhydrate to barium hydrate may generally be effected in from five to ten minutes.

The crude pulp obtained in the lithopone precipitating process is then suitably adjusted, in conformity with the methods outlined in the above mentioned copending applications, until the end point of the precipitating step exhibits the desired excess and ratio of hydrate to sulfhydrate radicals. The barium hydrate obtained in the practice of the present invention is of considerable importance in establishing that excess and ratio, particularly if the original "barium sulfide" liquor employed in the lithopone making step is deficient in barium hydrate content. Moreover, the addition of zinc sulfide, obtained simultaneously with the production of the barium hydrate in accordance with the invention, to the crude pulp in the lithopone process is also of considerable value because it enriches the lithopone in its zinc sulfide content. The net result is to give the final lithopone product greater hiding power than it would otherwise have.

While the above discussion is, for the most part, confined to the practice of the invention in the case of the manufacture of lithopone, the invention may also be suitably practiced in the manufacture of other pigments by wet-precipitation. Thus, for example, the zinc sulfide precipitated as a result of the reaction between the "barium sulfide" liquor and the zinic oxide may be filtered, dried, calcined, quenched and disintegrated to form commercial zinc sulfide pigment. The practice of the invention will readily lend itself to other modifications and uses to those skilled in this art. The invention may be practiced in a substantially continuous manner. That is to say, the reacting ingredients may be brought together as fast as the final slurry is withdrawn from the treatment operation.

Even in the case of manufacturing lithopone, the present invention lends itself to important variations. Should the main lithopone precipitating step result in a crude pulp that is not deficient in barium hydrate content, but it is desired to increase the hiding power of the final lithopone product, the barium hydrate obtained in the practice of the invention may be discarded (as by filtering) and the zinc sulfide alone added to the lithopone. On the other hand, if a lithopone of high strength or hiding power is not desired, but the lithopone precipitating liquors are low in barium hydrate, the zinc sulfide obtained in the invention may be discarded and the barium hydrate alone added to the main lithopone making process. In fact, a compromise may be resorted to—that is to say, the additions to the lithopone may consist of regulated amounts of zinc sulfide and barium hydrate obtained by the invention.

I claim:

1. In a method of preparing a reaction product suitable for use in the manufacture of lithopone and the like, the steps which comprise subjecting zinc oxide pigment of a particle size not larger than about 0.15 microns to the action of an aqueous solution of barium sulfide, and agitating and heating the slurry of zinc oxide and barium sulfide by introducing live steam therein whereby the zinc oxide particles are kept in suspension until substantially all of the zinc available in the zinc oxide is converted to zinc sufide pigment suspended in a solution of barium hydrate.

2. A method of preparing a reaction product suitable for use in the manufacture of lithopone and the like, which comprises subjecting a zinc oxide pigment of a very minute particle size to the action of an aqueous solution of barium sulfide, maintaining the aqueous mixture of barium sulfide at an elevated temperature, and agitating the heated aqueous mixture until substantially all of the zinc available in the zinc oxide is converted to zinc sulfide pigment suspended in a solution of barium hydrate.

In testimony whereof I affix my signature.

WILLIAM C. HOOEY.